US006314707B1

(12) United States Patent
Ryan

(10) Patent No.: US 6,314,707 B1
(45) Date of Patent: Nov. 13, 2001

(54) BALANCED RECIPROCATING, BRUSH CUTTING, MOWER ATTACHMENT

(76) Inventor: Cyril A. Ryan, 3050 Vincentia Rd., Palm Springs, CA (US) 92262

( * ) Notice: Subject to any disclaimer, the term of this patent is extended or adjusted under 35 U.S.C. 154(b) by 0 days.

(21) Appl. No.: 09/478,345

(22) Filed: Jan. 6, 2000

(51) Int. Cl.[7] .................................................. A01D 34/53
(52) U.S. Cl. ................................ 56/246; 56/13.6; 56/17.6
(58) Field of Search ........................... 56/246, 13.6, 17.6, 56/155, 296, 297, 299, 300, 301; 30/218, DIG. 1

(56) References Cited

U.S. PATENT DOCUMENTS

| | | |
|---|---|---|
| 2,448,078 | 8/1948 | Brown . |
| 2,680,340 | 6/1954 | Pazandak . |
| 3,657,868 | 4/1972 | Cousino . |
| 3,763,638 * | 10/1973 | Vogelenzang ........................... 56/293 |
| 3,973,378 * | 8/1976 | Batrasevich et al. .................. 56/11.9 |
| 4,107,906 | 8/1978 | Cousino . |
| 4,910,946 * | 3/1990 | Underwood ............................ 56/14.4 |
| 5,157,906 | 10/1992 | Abrahamson . |

* cited by examiner

Primary Examiner—Robert E. Pezzuto
Assistant Examiner—Arpad Fabian Kovacs
(74) Attorney, Agent, or Firm—Siemens Patent Services LC

(57) ABSTRACT

A reciprocating, brush cutting attachment for a vehicle such as a riding lawn mower. The attachment is in the form of a sickle head having a bottom support plate that acts as a frame for the sickle head. Two top blades reciprocate back and forth on top of the support plate, one on each side. The bottom support plate and the two top blades all include front blade edges having a plurality of teeth. As the top blades move back and forth, vegetation between the teeth is cut. The prime advantage of the sickle head of the present invention is the reduction of vibrations achieved by continuously driving the colinear top blades in opposite directions with respect to each other.

14 Claims, 2 Drawing Sheets

BALANCED RECIPROCATING, BRUSH CUTTING, MOWER ATTACHMENT

BACKGROUND OF THE INVENTION

1. Field of the Invention

The present invention is directed to an anti-vibration, brush cutting attachment. More specifically, the attachment is a reciprocating cutter for mounting on the front of a vehicle, such as a tractor or riding lawn mower. The reciprocating cutter removes high grass and brush prior to mowing or traversing the area in front of the vehicle, without causing excessive vibrations to the vehicle or the attachment.

2. Description of the Prior Art

One common type of cutting attachment for lawn tractors, riding lawn mowers, and other vehicles is a sickle bar. Sickle bars can also be formed as stand-alone devices (such as electric hedge trimmers or sickle type lawn mowers) and include two sets of cutting teeth disposed adjacent and abutting one another. As one or both sets of teeth are moved relative to one another in a reciprocating motion, brush, grass and debris located between adjacent teeth are severed. Several types of sickle bars are disclosed in the following U.S. Patents. What is lacking in these references and the prior art as a whole, is a reciprocating sickle bar having two sets of oppositely and continuously driven cutting teeth. This feature of the present invention reduces vibration by balancing oppositely driven masses.

A reciprocating tedder attachment for power mower sickle bars is taught in U.S. Pat. No. 2,448,078, issued on Aug. 31, 1948 to Brown. While the sickle bars shown in this reference are similar in basic operation to the reciprocating cutter of the present invention, the main thrust of this invention involves removal of the cut brush, and the issue of anti-vibration is not discussed. Furthermore, the sickle bars of Brown are not an attachment, but a permanent part of a power mower.

In U.S. Pat. No. 2,680,340, issued on Jun. 8, 1954 to Pazandak, a sickle head mechanism with support mounting is disclosed. This sickle head also operates in a similar fashion to the present invention and is designed to reduce vibrations by yieldably mounting non-reciprocating parts of the sickle head. In this manner, the vibrations of the sickle knife are offset, by the opposite vibrations of the cutter bar and other non-reciprocating parts. While this construction may reduce the overall vibrations transmitted from the sickle head to the handles of the mower, there is no discussion of oppositely driving mower components to thereby cancel the vibration, as in the present invention.

U.S. Pat. No. 5,157,906, issued to Abrahamson on Oct. 27, 1992 shows a divided sickle bar arrangement wherein separate half-sickle portions are individually driven in opposition by belts. This arrangement differs significantly from the positive central crankshaft drive of the instant invention.

An impact actuated mowing machine is described in is U.S. Pat. Nos. 3,657,868, and which issued on Apr. 25, 1972 to Cousino. Two cutting plates are driven in opposite directions against the force of a resilient element. The front edge of each of the cutting plates includes a plurality of cutting teeth that are superimposed over one another in the rest position. Two impact rollers simultaneously drive the cutting plates in opposite directions, thereby reducing vibrations using a cancellation effect. This design uses oppositely moving masses to cancel vibrations, however, it requires two driving sources (the impact rollers), and due to the non-continuous nature of the motion, inherently produces greater vibration than the present invention, wherein only a single driving source (crankshaft) is used, and the oppositely moving parts are continuously driven in opposite directions.

In U.S. Pat. No. 4,107,906, issued on Aug. 22, 1978 to Cousino, another type of impact actuated lawn mower is disclosed. In this impact mower, however, the cutting teeth are not driven simultaneously in opposite directions. The subject of vibration reduction is not discussed or taught in this patent.

None of the above references and patents, taken either singly or in combination, is seen to describe the instant invention as claimed.

SUMMARY OF THE INVENTION

The present invention is a reciprocating sickle bar head for cutting brush, grass, small trees and other types of vegetation. This sickle bar head is intended to be mounted on the front of a riding lawn mower, lawn tractor or other type of vehicle, but may be used in other applications as well. A number of teeth are formed on a front blade edge of a bottom solid plate. The bottom plate acts as a support for the other components of the sickle head. Two top blades are supported on top of the bottom plate, one on the right side of the sickle head and one on the left. The top blades include teeth along their front blade edge, such that the teeth align with those on the front blade edge of the bottom plate. A central, vertical drive shaft is supported in a bearing that is mounted in a hole in the bottom plate. The drive shaft extends below the bottom plate and includes a drive pulley mounted on its bottom portion. The drive pulley is operatively connected to a blade driving system or a power take-off (PTO) by a drive belt. The upper portion of the drive shaft includes two cranks extending 180° relative to each other, with the distal ends of the cranks being operatively connected to a respective top blade by a connecting rod. As the driveshaft rotates, the relative positions of the cranks result in the top blades being driven continuously in opposite directions. The top blades (along with their driving components) are formed substantially identical, so that the combined mass of moving parts on one side of the sickle head is the same as the combined mass of moving parts on the opposite side.

The above described sickle head construction, results in a substantial reduction of vibrations being transmitted to the vehicle to which the sickle head is mounted. The method of reducing vibrations by driving equal masses in opposite directions and at opposite positions is the main thrust of the present invention. Other vibration reducing advantages include the two top blades being mounted on top of the bottom plate in a co-linear arrangement. This decreases the vibrations as small offsets between the driven blades cause a rotational vibration to be introduced about the center of mass of the system. The continuous driving motion imparted by the drive shaft, cranks and connecting rods also reduces vibrations by moving the top blades with a smooth, reciprocating action. Instead of cutting using an intermittent impact manner, the present invention uses a less violent shearing action.

In addition to the anti-vibration features of the present invention, other advantages are presented by the sickle head construction. The lower pulley allows the sickle head to be easily retrofitted on existing vehicles having belt driven blade systems. Once the lower plate is mounted to the front of the vehicle, a drive belt can be routed about the drive pulley and the installation is complete. The attachment of the sickle head and drive belt is similar to that used in the inventor's previous U. S. Pat. No. 5,600,943 which issued on Feb. 11, 1997 and is hereby incorporated by reference. In addition, the sickle head of the present invention has a relatively simple construction, allowing for lighter weight and easier maintenance.

Accordingly, it is a first object of the invention to provide a sickle head that reduces vibrations by moving equal masses in opposite directions.

It is another object of the invention to reduce vibrations in a sickle head by oppositely driving cutting blades in a co-linear arrangement.

It is a further object of the invention to provide an anti-vibration sickle head that can be easily retrofit to the front of a vehicle.

These and other objects of the present invention will become readily apparent upon further review of the following specification and drawings.

DETAILED DESCRIPTION OF THE PREFERRED EMBODIMENTS

Figure 1:
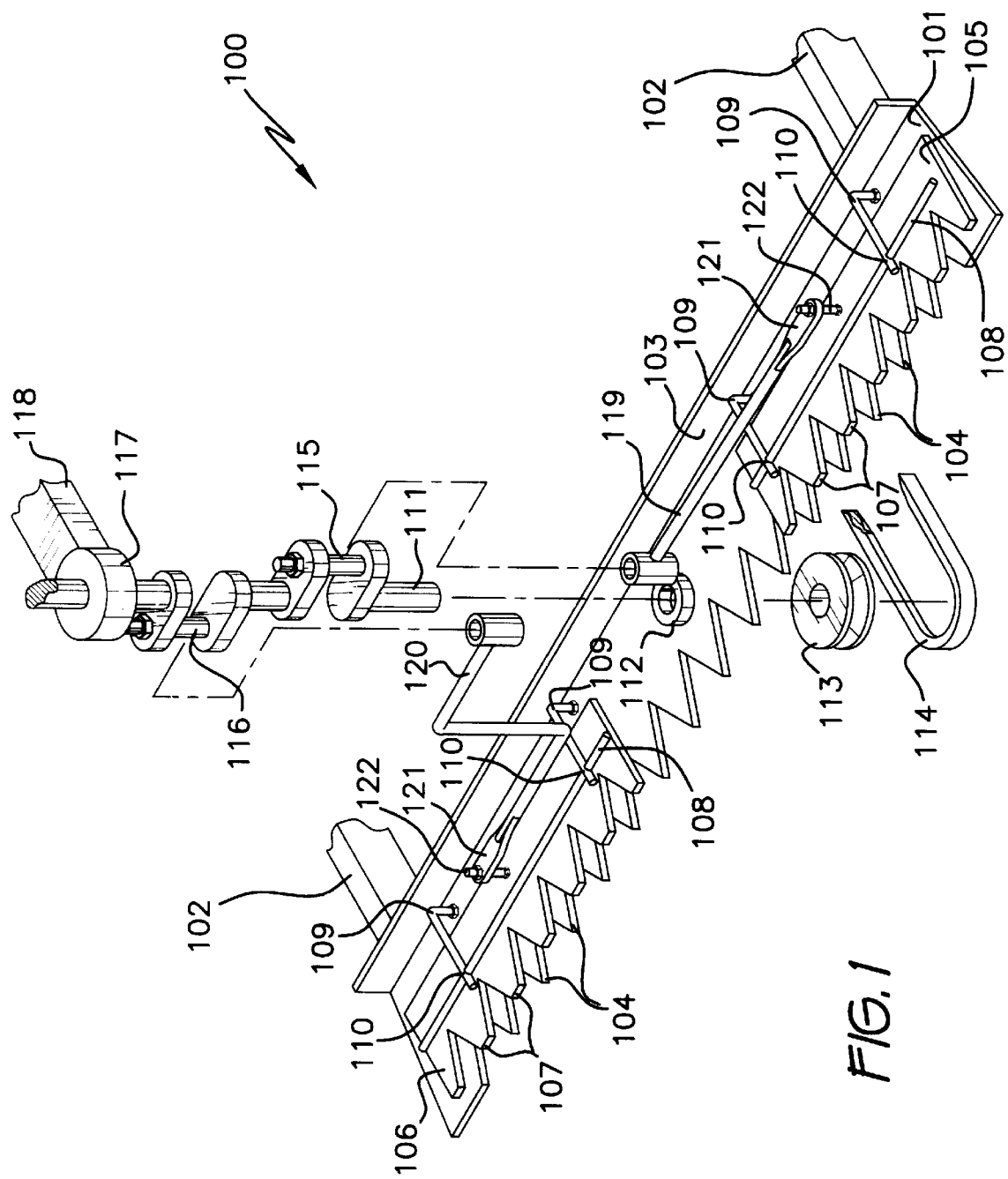
FIG. 1 is an isometric, partially exploded view of the sickle head of the present invention.
Figure 2:
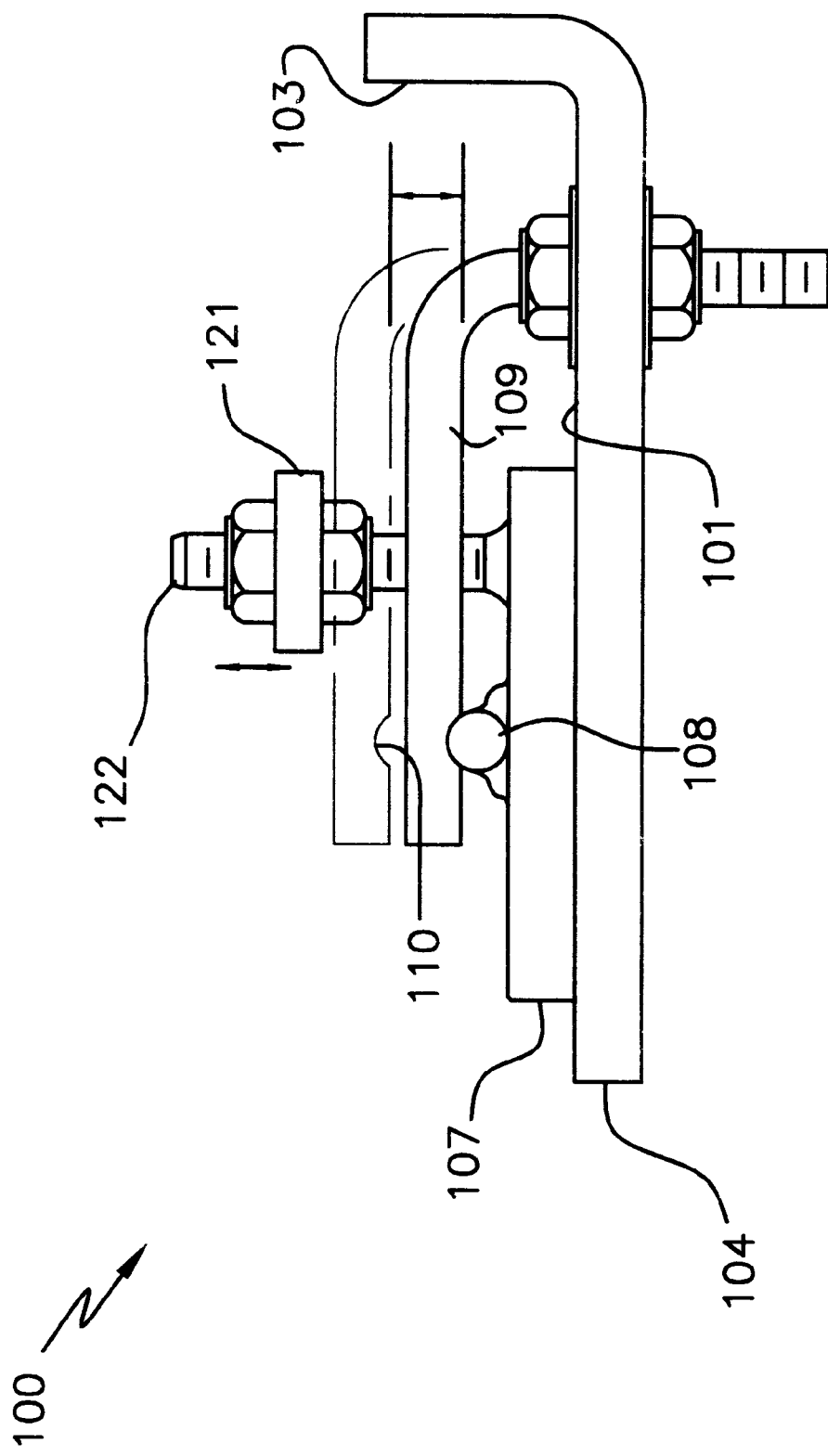
FIG. 2 is an enlarged view illustrating the vertical adjustment capabilities of the guide pins and the connecting rods.

The present invention may be understood more readily by reference to the following detailed description of preferred embodiments of the invention and the Figures.

It is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application, in order to more fully describe the state of the art to which this invention pertains.

For clarity, several components of the sickle head 100 of the present invention have been shown in the figure as an exploded view. A bottom, support plate 101 acts as a frame for the remaining sickle head components. Two support members 102 are welded or otherwise attached to a rear vertical portion 103 of bottom support plate 101. Support members 102 are preferably connected to the front end of a vehicle, although other sickle head applications could equally benefit from the anti-vibration design shown herein. The actual connections to a vehicle are well known in the aforementioned prior art, and have therefore not been described here in detail. As well as acting as a frame, the support plate 101 includes a number of teeth 104 formed on the plate's front blade edge. Two, reciprocating, top blades 105, 106 are supported on top of the bottom plate 101, one on each side of the sickle head 100. The top blades 105, 106 include teeth 107 along their front blade edge. When top blades 105, 106 are reciprocated along the length of bottom plate 101, teeth 107 and 104 cut any brush or grass that is between them as is well known in the art. Each side of the rear vertical portion 103 includes two guide pins 109 that are welded, threaded or otherwise attached thereon. Each of the guide pins 109 has a reduced diameter portion 110 adjacent its distal end. In order to guide and support the top blades 105, 106 both blades include a guide rod 108 that slides back and forth in the reduced diameter portion 110 of the respective two guide pins 109.

The driving system for the top blades 105, 106 includes a central, vertical drive shaft 111 that is supported in a lower bearing 112 mounted to the bottom plate 101. The drive shaft 111 (shown here in a raised position for clarity) extends through a hole in the bottom plate 101 and includes a drive pulley 113 mounted thereon below the bottom plate 101. The drive pulley 113 is operatively connected to a blade driving system or a power take-off (PTO) by a drive belt 114. This connection includes a belt tensioning system and other pulleys and is not described here as being considered well known in the art of lawn tractors and other examples of these types of vehicles. The upper portion of the drive shaft 111 includes a lower crank 115 and an upper crank 116. Cranks 115 and 116 are diametrically opposed and extend perpendicular to shaft 111 and 180° relative to each other. An upper bearing 117 supports the top of the drive shaft 111, which is in turn supported by member 118. Member 118 can be in the form of a bracket attached to support plate 101, or may be connected to a portion of the vehicle. It is important that, however mounted, member 118 and support members 102 should be rigidly connected to avoid putting excessive stress on the drive shaft 111. The distal ends of the cranks 115, 116 are connected to their respective top blades 105, 106 by connecting rods 119 and 120, respectively. Each of the connecting rods 119 and 120 include a universal joint 121 and a height adjustment rod 122. The universal joints 121 allow for a rotational connection, while also providing allowance for any slight misalignments. Height adjustment rods 122 are calibrated in length to align the connecting rods 119, 120 with their respective cranks 115, 116.

In operation, the belt tensioning system (not shown) increases friction between the drive belt 114 and pulley 113 and other pulley(s) in the belt drive system. The pulley is fixed with respect to drive shaft 111 and therefore the drive shaft 111 rotates as well. As the drive shaft 111 rotates, the distal ends of the cranks 115, 116 rotate about the shaft 111 from opposite positions. This results in the top blades 105, 106 and their associated components being driven continuously in opposite directions. The top blades 105, 106 (along with their associated components) are formed substantially identical, so that the combined mass of moving parts on one side of the sickle head 100 is approximately the same as the combined mass of oppositely moving parts on the opposite side of the sickle head 100. As with any balanced system, small adjustments can be made by adding weight to one side or the other, in the form of washers on threaded connections or by any other suitable means. Once balanced, the sickle head 100 of the present invention imparts almost no vibration to the vehicle to which it is mounted. Another important contributor to the anti-vibration feature, is the co-linear relationship between the blades 105, 106. This co-linear configuration further reduces vibration by avoiding rotational vibrations that are produced when the operational paths of these masses are offset.

Many different applications and modifications to the above described invention can be envisioned. Different driving mechanisms may be used in place of the belt and pulley system such as direct drive of the shaft 111, or chain or gear drive depending on the overall size and application. While the shaft 111 has been shown in the figure as elongate, this is not intended to be limiting, and shorter more compact configurations may be desired in specific applications. In any event, the present invention is not intended to be limited by any of the above embodiments, but only as set forth in the following claims.

What is claimed is:

1. A sickle head for cutting brush, grass and other vegetation, said sickle head comprising:
   a bottom, support plate including a left side, a right side and a front blade edge, said front blade edge having a plurality of teeth;
   a first, top blade supported on top of the left side of said bottom plate, said first top blade having a blade edge with a first number of teeth;
   a second, top blade supported on top of the right side of said bottom plate, said second top blade having a blade edge with a second number of teeth;
   a drive shaft rotatably and centrally mounted to said support plate;
   first driving means for driving said first top blade along said top left side of said bottom plate in a reciprocating, continuous motion, said first means for driving comprising a first crank attached perpendicularly to said drive shaft, and a first connecting rod operatively attaching said first crank and said first top blade; and
   second driving means for driving said second top blade along said top right side of said bottom plate in a reciprocating, continuous motion, said second means for driving comprising a second crank attached perpendicularly to said drive shaft and disposed at a 180 degree angle with respect to said first crank, and a second connecting rod operatively attaching said second crank and said first top blade; wherein
   wherein said first number of teeth and said second number of teeth engage said plurality of teeth on said support plate to thereby cut vegetation between said teeth, as said top blades are driven in the reciprocating continuous motion; and
   said first driving means and said second driving means are configured to drive said first top blade and said second top blade in continuous, opposite directions with respect to one another.

2. The sickle head of claim 1 wherein said first top blade and said second top blade are mounted and driven in a co-linear relationship with respect to each other.

3. The sickle head of claim 2 further comprising a drive pulley attached to a bottom end of said drive shaft below said support plate, said drive pulley being configured to be driven by a drive belt to thereby rotate said drive shaft.

4. The sickle head of claim 3 wherein said drive shaft is rotatably mounted to said support plate by a lower bearing.

5. The sickle head of claim 4 wherein a top portion of said drive shaft is supported by an upper bearing.

6. The sickle head of claim 2 wherein: said first connecting rod includes a first universal joint and a first height adjustment rod;
   said second connecting rod includes a second universal joint and a second height adjustment rod;
   said first height adjustment rod aligns said first connecting rod with said first crank; and
   said second height adjustment rod aligns said second connecting rid with said second crank.

7. The sickle head of claim 1 wherein:
   said bottom support plate further includes a rear vertical portion with a first left guide pin, a second left guide pin, a first right guide pin and a second right guide pin, said guide pins extend parallel to said support plate and include a reduced diameter portion adjacent their distal ends;
   said first top blade includes a first guide rod, said first guide rod extending between said reduced diameter portions of said first left guide pin and said second left guide pin, said first, top blade thereby being slidably attached to the left side of said bottom plate; and
   said second top blade includes a second guide rod, said second guide rod extending between said reduced diameter portions of said first right guide pin and said second right guide pin, said second, top blade thereby being slidably attached to the right side of said bottom plate.

8. A cutting attachment for a vehicle, said cutting attachment comprising:
   a bottom, support plate including a left side, a right side and a front blade edge, said front blade edge having a plurality of teeth;
   a first, top blade supported on top of the left side of said bottom plate, said first top blade having a blade edge with a first number of teeth;
   a second, top blade supported on top of the right side of said bottom plate, said second top blade having a blade edge with a second number of teeth;
   a drive shaft rotatably and centrally mounted to said support plate;
   first driving means for driving said first top blade along said top left side of said bottom plate in a reciprocating, continuous motion, said first means for driving comprising a first crank attached perpendicularly to said drive shaft, a first connecting rod operatively attaching said first crank and said first top blade;
   second driving means for driving said second top blade along said top right side of said bottom plate in a reciprocating, continuous motion, said second means for driving comprising a second crank attached perpendicularly to said drive shaft and disposed at a 180° degree angle with respect to said first crank, a second connecting rod operatively attaching said second crank and said first top blade; wherein
   said first number of teeth and said second number of teeth engage said plurality of teeth on said support plate to thereby cut vegetation between said teeth, as said top blades are driven in the reciprocating continuous motion; and
   said first driving means and said second driving means are configured to drive said first top blade and said second top blade in continuous, opposite directions with respect to one another.

9. The cutting attachment of claim 8 wherein said first top blade and said second top blade are mounted and driven in a co-linear relationship with respect to one another.

10. The cutting attachment of claim 9 further comprising a drive pulley attached to a bottom end of said drive shaft below said support plate, said drive pulley being configured to be driven by a drive belt to thereby rotate said drive shaft.

11. The cutting attachment of claim 10 wherein said drive shaft is rotatably mounted to said support plate by a lower bearing.

12. The cutting attachment of claim 11 wherein a top portion of said drive shaft is supported by an upper bearing.

13. The sickle head of claim 9 wherein:
   said first connecting rod includes a first universal joint and a first height adjustment rod;
   said second connecting rod includes a second universal joint and a second height adjustment rod;
   said first height adjustment rod aligns said first connecting rod with said first crank; and said second height adjustment rod aligns said second connecting rod with said second crank.

14. The cutting attachment of claim 8 wherein:

said bottom support plate further includes a rear vertical portion with a first left guide pin, a second left guide pin, a first right guide pin and a second right guide pin, said guide pins extend parallel to said support plate and included a reduced diameter portion adjacent their distal ends;

said first top blade includes a first guide rod, said first guide rod extending between said reduced diameter portions of said first left guide pin and said second left guide pin, said first, top blade thereby being slidably attached to the left side of said bottom plate;

said second top blade includes a second guide rod, said second guide rod extending between said reduced diameter portions of said first right guide pin and said second right guide pin, said second, top blade thereby being slidably attached to the right side of said bottom plate.

* * * * *